United States Patent
Goy et al.

(10) Patent No.: US 12,497,995 B2
(45) Date of Patent: Dec. 16, 2025

(54) MICROSCOPIC SURFACE TEXTURING FOR SHOULDERED SHAFT AND BEARING PADS

(71) Applicant: Hamilton Sundstrand Corporation, Charlotte, NC (US)

(72) Inventors: Edward W. Goy, Crystal Lake, IL (US); Weishun W. Ni, Loves Park, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 63 days.

(21) Appl. No.: 18/415,163

(22) Filed: Jan. 17, 2024

(65) Prior Publication Data
US 2025/0230841 A1 Jul. 17, 2025

(51) Int. Cl.
*F16C 17/03* (2006.01)
*F16C 17/06* (2006.01)
(Continued)

(52) U.S. Cl.
CPC ............... *F16C 17/03* (2013.01); *F16C 17/06* (2013.01); *F16C 17/107* (2013.01); *F16C 33/12* (2013.01); *F16C 2360/42* (2013.01)

(58) Field of Classification Search
CPC ................................. F16C 17/03; F16C 17/06
See application file for complete search history.

(56) References Cited

U.S. PATENT DOCUMENTS

| | | | |
|---|---|---|---|
| 5,231,912 A | * | 8/1993 | Akasaka ............... F04B 1/2085 91/499 |
| 6,368,072 B1 | | 4/2002 | Inoue et al. |

(Continued)

FOREIGN PATENT DOCUMENTS

| | | |
|---|---|---|
| CN | 111365208 A | 7/2020 |
| CN | 109538626 B | 9/2020 |

(Continued)

OTHER PUBLICATIONS

Ni et al., "Two Dimensional Analytical Analysis of Fluid Film Thickness on Pivoting Tilting Pad Bearings" SAE Transactions (Jan. 2007) 7 pages.

(Continued)

*Primary Examiner* — James Pilkington
(74) *Attorney, Agent, or Firm* — CANTOR COLBURN LLP

(57) ABSTRACT

A shouldered shaft assembly of a variable displacement, bent axis piston pump is provided. The shouldered shaft assembly includes a bearing retainer housing including radially inwardly facing tilt pad bearings and axially facing tilt pad thrust bearings and a shouldered shaft. The shouldered shaft is disposed in the bearing retainer housing and includes a first shaft section, a second shaft section and an axial surface. The second shaft section has a larger diameter than the first shaft section and includes an outer diameter (OD) surface. The OD surface faces and fluid-dynamically interacts with the radially inwardly facing tilt pad bearings. The OD surface is formed to define microscopic surface texturing for increased fluid-dynamic interaction. The axial surface extends between the first shaft section and the second shaft section. The axial surface faces and fluid-dynamically interacts with the axially facing tilt pad thrust bearings.

17 Claims, 4 Drawing Sheets

(51) Int. Cl.
  *F16C 17/10*   (2006.01)
  *F16C 33/12*   (2006.01)

(56) References Cited

U.S. PATENT DOCUMENTS

| | | |
|---|---|---|
| 6,827,649 B2 | 12/2004 | Menosky et al. |
| 6,902,168 B2 | 6/2005 | Tejima |
| 7,238,066 B2* | 7/2007 | Taylor .................. F16C 17/06 |
| | | 114/151 |
| 9,568,106 B2 | 2/2017 | Khonsari |
| 10,072,707 B2 | 9/2018 | Futae et al. |
| 10,077,803 B2 | 9/2018 | Choi |
| 11,391,376 B2 | 7/2022 | Arai |
| 11,662,026 B2 | 5/2023 | Ni et al. |
| 11,713,716 B2 | 8/2023 | Goy et al. |
| 2011/0243762 A1* | 10/2011 | Daikoku ................. F02B 33/40 |
| | | 384/105 |

FOREIGN PATENT DOCUMENTS

| | | |
|---|---|---|
| EP | 3499033 A1 | 6/2019 |
| EP | 3999750 B1 | 8/2023 |
| KR | 20180107842 A | 10/2018 |

OTHER PUBLICATIONS

Search Report issued in European Patent Application No. 25152023.5; Date of Mailing Mar. 14, 2025 (4 pages).

* cited by examiner

MICROSCOPIC SURFACE TEXTURING FOR SHOULDERED SHAFT AND BEARING PADS

BACKGROUND

Exemplary embodiments of the present disclosure relate generally to fluid machines and, in some embodiments, to microscopic surface texturing for a shouldered shaft and bearing pads of a fluid machine.

Certain fluid machines utilize tilt pad bearings that rely on a fluid film to carry loads. An example of such a fluid machine is a variable displacement, bent axis piston pump. Higher pressures, lower speeds, hotter fuel, higher tilt angles and operation on a high pressure relief valve in a failure mode are all examples of situations which would apply high loads on radial and axial bearings of a variable displacement, bent axis pump.

Accordingly, a need exists for an improved fluid machine that can handle high applied loads on radial and axial bearings.

BRIEF DESCRIPTION

According to an aspect of the disclosure, a shouldered shaft assembly of a variable displacement, bent axis piston pump is provided. The shouldered shaft assembly includes a bearing retainer housing including radially inwardly facing tilt pad bearings and axially facing tilt pad thrust bearings and a shouldered shaft. The shouldered shaft is disposed in the bearing retainer housing and includes a first shaft section, a second shaft section and an axial surface. The second shaft section has a larger diameter than the first shaft section and includes an outer diameter (OD) surface. The OD surface faces and fluid-dynamically interacts with the radially inwardly facing tilt pad bearings. The OD surface is formed to define microscopic surface texturing for increased fluid-dynamic interaction. The axial surface extends between the first shaft section and the second shaft section. The axial surface faces and fluid-dynamically interacts with the axially facing tilt pad thrust bearings.

In accordance with additional or alternative embodiments, the OD surface is formed to define dimples as the microscopic surface texturing.

In accordance with additional or alternative embodiments, the dimples are one or more of spherical and cylindrical with rounded edges.

In accordance with additional or alternative embodiments, the dimples are arranged in a grid-pattern.

In accordance with additional or alternative embodiments, the dimples have a depth of about 0.00254 mm to about 0.0127 mm.

In accordance with additional or alternative embodiments, at least one or more of the radially inwardly facing tilt pad bearings, the axially facing tilt pad thrust bearings and the axial surface are/is formed to define additional microscopic surface texturing for increased fluid-dynamic interaction.

In accordance with additional or alternative embodiments, the radially inwardly facing tilt pad bearings are formed to define the additional microscopic surface texturing offset from the microscopic surface texturing of the OD surface.

According to an aspect of the disclosure, a shouldered shaft assembly of a variable displacement, bent axis piston pump is provided. The shouldered shaft assembly includes a bearing retainer housing including radially inwardly facing tilt pad bearings and axially facing tilt pad thrust bearings and a shouldered shaft. The shouldered shaft is disposed in the bearing retainer housing. The shouldered shaft includes a first shaft section, a second shaft section and an axial surface. The second shaft section has a larger diameter than the first shaft section. The second shaft section includes an outer diameter (OD) surface. The OD surface faces and fluid-dynamically interacts with the radially inwardly facing tilt pad bearings. The axial surface extends between the first shaft section and the second shaft section. The axial surface faces and fluid-dynamically interacts with the axially facing tilt pad thrust bearings. The radially inwardly facing tilt pad bearings are formed to define microscopic surface texturing for increased fluid-dynamic interaction.

In accordance with additional or alternative embodiments, the radially inwardly facing tilt pad bearings are formed to define dimples as the microscopic surface texturing.

In accordance with additional or alternative embodiments, the dimples are one or more of spherical and cylindrical with rounded edges.

In accordance with additional or alternative embodiments, the dimples are arranged in a grid-pattern.

In accordance with additional or alternative embodiments, the dimples have a depth of about 0.00254 mm to about 0.0127 mm.

In accordance with additional or alternative embodiments, at least one or more of the axially facing tilt pad thrust bearings, the axial surface and the OD surface are/is formed to define additional microscopic surface texturing for increased fluid-dynamic interaction.

In accordance with additional or alternative embodiments, the OD surface is formed to define the additional microscopic surface texturing offset from the microscopic surface texturing of the radially inwardly facing tilt pad bearings.

According to an aspect of the disclosure, a shouldered shaft assembly of a variable displacement, bent axis piston pump is provided. The shouldered shaft assembly includes a bearing retainer housing including radially inwardly facing tilt pad bearings and axially facing tilt pad thrust bearings and a shouldered shaft. The shouldered shaft is disposed in the bearing retainer housing and includes a first shaft section, a second shaft section and an axial section. The second shaft section has a larger diameter than the first shaft section and includes an outer diameter (OD) surface. The OD surface faces and fluid-dynamically interacts with the radially inwardly facing tilt pad bearings. The axial surface extends between the first shaft section and the second shaft section. The axial surface which faces and fluid-dynamically interacts with the axially facing tilt pad thrust bearings. The axially facing tilt pad thrust bearings are formed to define microscopic surface texturing for increased fluid-dynamic interaction.

In accordance with additional or alternative embodiments, the axially facing tilt pad thrust bearings are formed to define dimples as the microscopic surface texturing.

In accordance with additional or alternative embodiments, the dimples are one or more of spherical and cylindrical with rounded edges.

In accordance with additional or alternative embodiments, the dimples are arranged in a grid-pattern.

In accordance with additional or alternative embodiments, the dimples have a depth of about 0.00254 mm to about 0.0127 mm.

In accordance with additional or alternative embodiments, at least one or more of the radially inwardly facing tilt pad thrust bearings, the axial surface and the OD surface are/is formed to define additional microscopic surface texturing for increased fluid-dynamic interaction.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

As will be described below, a fluid machine is provided as a variable displacement, bent axis piston pump, for example. The fluid machine includes a shouldered shaft that rotates within an inwardly facing array of first tilt pad bearings and against another axially facing array of second tilt pad bearings. The fluid machine has microscopic surface texturing and/or etching on at least one or more of an outer diameter (OD) of the shouldered shaft, first tilt pad bearings and the second tilt pad bearings. The microscopic surface texturing and/or etching serves to increase fluid film generation and formation, and localized fluid lifting pressure that allows for higher radial and axial load carrying capabilities.

Figure 1:
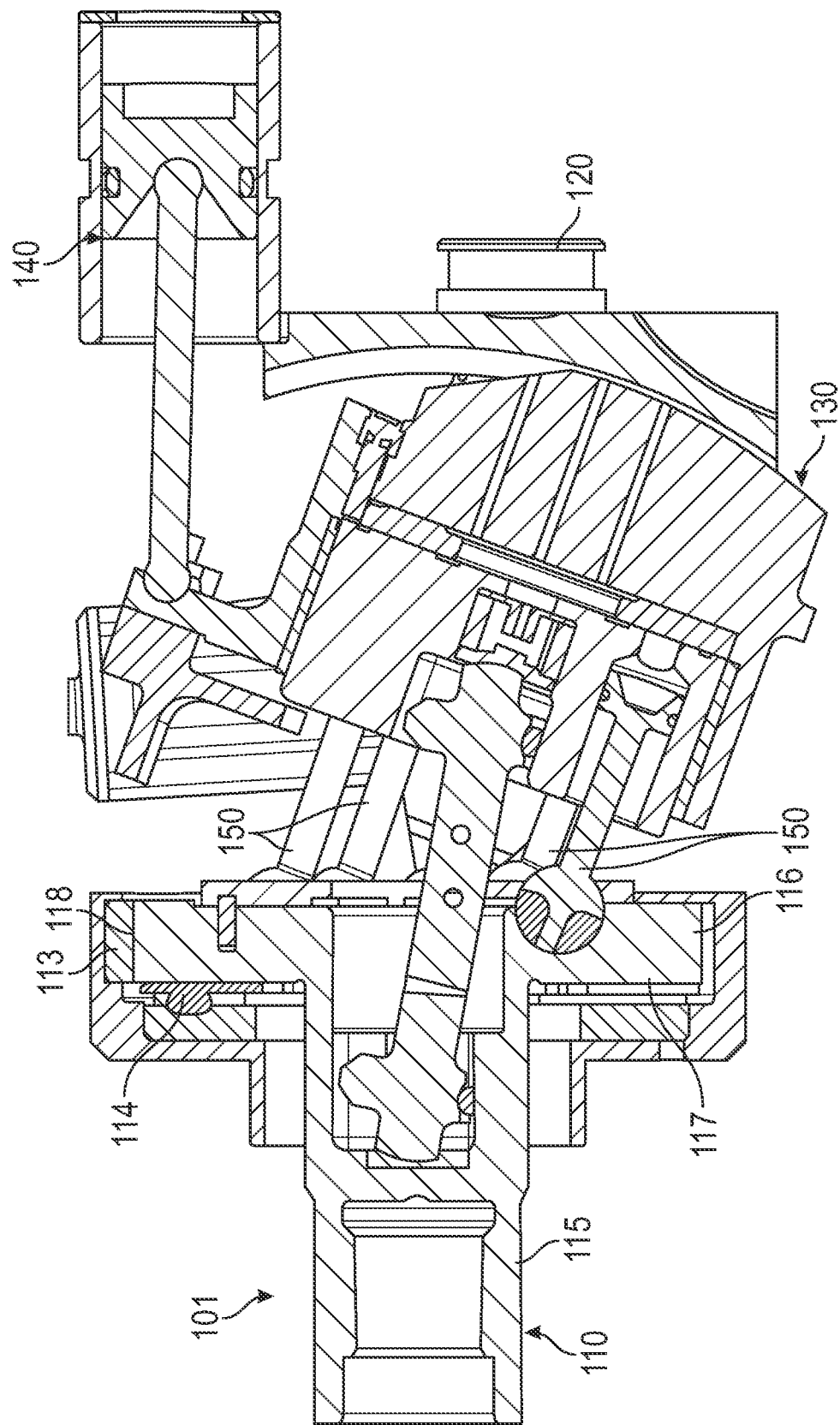
FIG. 1 is a side view of a fluid machine configured as a variable displacement, bent axis piston pump in accordance with embodiments.
Figure 2:
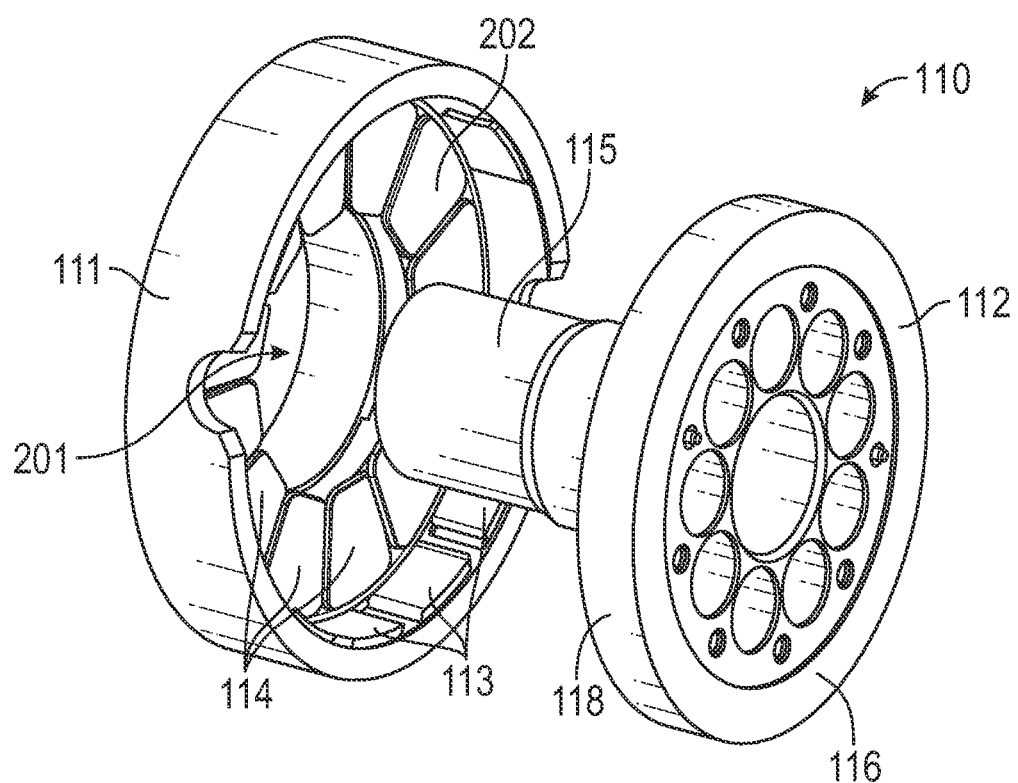
FIG. 2 is a perspective view of a shouldered shaft assembly of the variable displacement, bent axis piston pump of FIG. 1 in accordance with embodiments.
Figure 3:
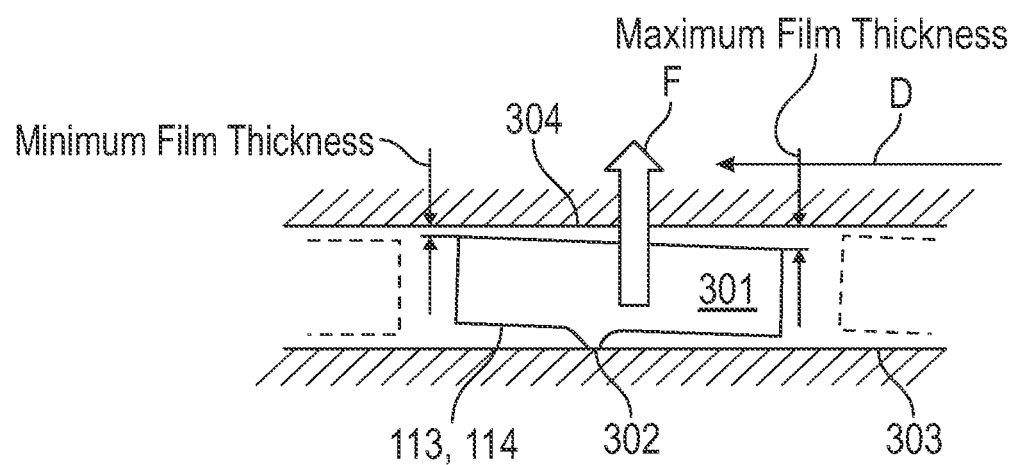
FIG. 3 is a side schematic illustration of an operation of a tilt pad bearing of the variable displacement, bent axis piston pump of FIG. 1 in accordance with embodiments.

With reference to FIGS. 1-3, a fluid machine is provided as a variable displacement, bent axis piston pump 101, for example. The variable displacement bent axis pump 101 includes a shouldered shaft assembly 110 that receives rotational energy from a gearbox, a line 120 to discharge pressure toward a rear cover, a pivot assembly 130 which generates the pressure to be discharged, an actuator piston 140 that controls a response of the pivot assembly 130 according to control pressure and flow from a compensator valve and an array of piston elements 150. The array of piston elements 150 translate in response to rotation of the shouldered shaft assembly 110. Translations of the piston elements 150 causes the pivot assembly 130 to pivot in accordance with the control exerted by the actuator piston 140 and the pivoting of the pivot assembly 130 generated the pressure and required flow to be discharged via the line 120.

The shouldered shaft assembly 110 includes a bearing retainer housing 111 and a shouldered shaft 112 supportively disposed in the bearing retainer housing 111. The bearing retainer housing 111 includes radially inwardly facing tilt pad bearings 113 and axially facing tilt pad thrust bearings 114. The shouldered shaft 112 includes a first shaft section 115, a second shaft section 116, which has a larger diameter than the first shaft section 115, and an axial surface 117 (see FIG. 1) extending between the first shaft section 115 and the second shaft section 116. The second shaft section 116 has an OD surface 118.

As shown in FIG. 2, the bearing retainer housing 111 is formed to define a bore 201 through which the first shaft section 115 is extendable so that the axial surface 117 (see FIG. 1) can be seated on or disposed proximate to the axially facing tilt pad thrust bearings 114 and so that the OD surface 118 can be seated within an annular space 202 to be surrounded by the radially inwardly facing tilt pad bearings 113. The axial surface 117 can thus face and fluid-dynamically interact with the axially facing tilt pad thrust bearings 114 and the OD surface 118 can thus face and fluid-dynamically interact with the radially inwardly facing tilt pad bearings 113.

As shown in FIG. 3, the radially inwardly facing tilt pad bearings 113 and the axially facing tilt pad thrust bearings 114 are each provided as a tilt pad body 301 with a pivot point 302 that is seated on a support body 303. The tilt pad body 301 can thus pivot about the pivot point 302 such that an orientation of a surface of the tilt pad body 301 changes relative to another body 304 (i.e., the axial surface 117 relative to the axially facing tilt pad thrust bearings 114 and the OD surface 118 relative to the radially inwardly facing tilt pad bearings 113). That is, as the body 304 rotates relative to the support body 303 or vice versa in the relative rotation direction D as an example, the tilt pad body 301 can pivot about the pivot point 302 to have an increased film thickness along its leading edge and a minimum film thickness along its trailing edge (where the leading and trailing edges are defined according to the rotation direction D). As such, the tilt pad body 301 generates a lifting force F which urges the body 304 away from the tilt pad body 301.

With the configurations described above, fluid film generation and formation between the axial surface 117 and the axially facing tilt pad thrust bearings 114 and between the OD surface 118 and the radially inwardly facing tilt pad bearings 113 serves to react to axial and radial loads that may be applied to the shouldered shaft assembly 110 during an operation of the variable displacement, bent axis piston pump 101. In accordance with embodiments, increased fluid film generation and formation between the axial surface 117 and the axially facing tilt pad thrust bearings 114 and between the OD surface 118 and the radially inwardly facing tilt pad bearings 113 as described below serves to increase an ability of the variable displacement, bent axis piston pump 101 to react to the axial and radial loads without making structural changes to the various components described herein that might otherwise increase a size and weight of the variable displacement, bent axis piston pump 101.

Figure 4A:
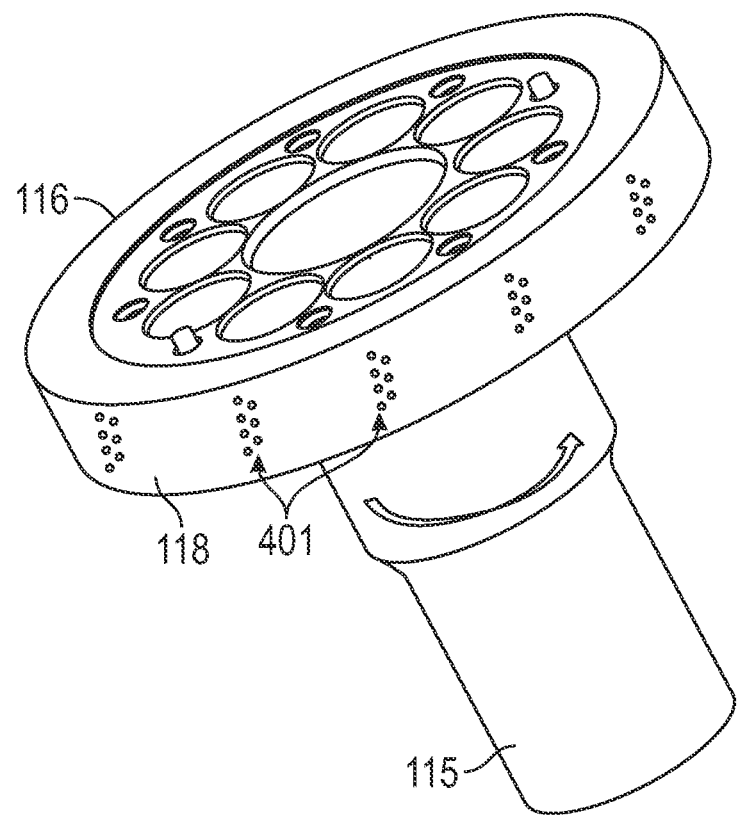
FIG. 4A is a perspective view of a shouldered shaft with microscopic surface texturing of the shouldered shaft assembly of FIG. 2 in accordance with embodiments.
Figure 4B:
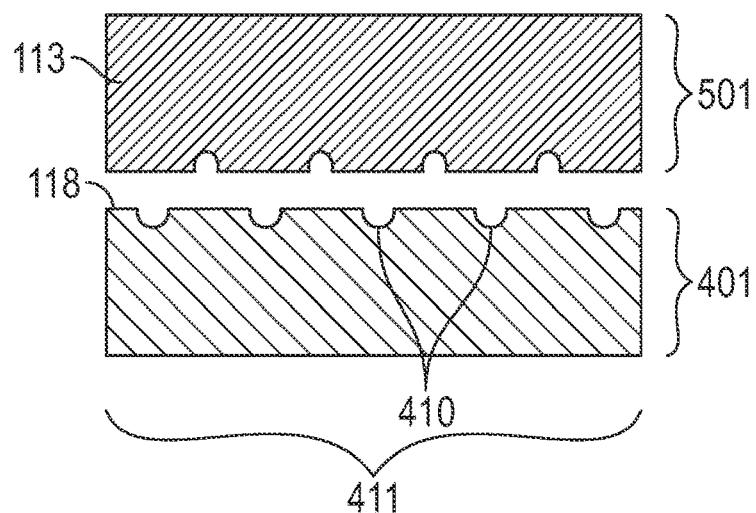
FIG. 4B is a side schematic view of microscopic surface texturing of an outer diameter (OD) of the shouldered shaft of FIG. 4A in accordance with embodiments.
Figure 5:
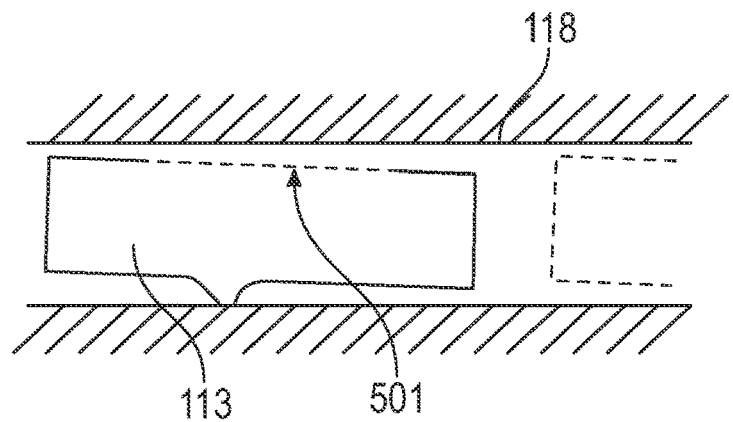
FIG. 5 is a side schematic view of microscopic surface texturing of a radially inwardly facing tilt pad bearing of the shouldered shaft assembly of FIG. 2 in accordance with embodiments.
Figure 6:
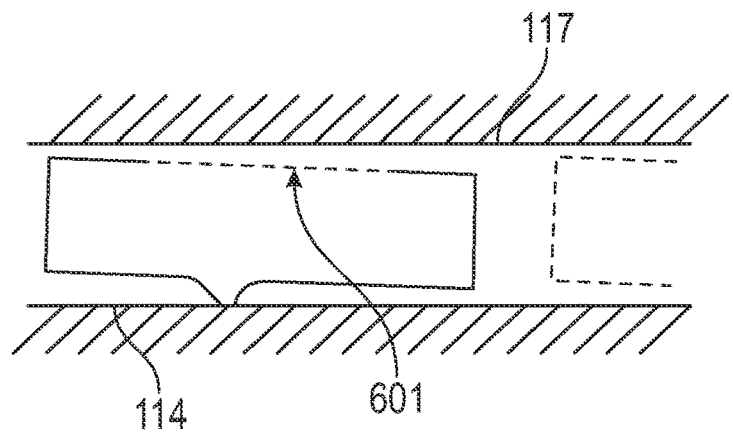
FIG. 6 is a side schematic view of microscopic surface texturing of an axially facing tilt pad thrust bearing of the shouldered shaft assembly of FIG. 2 in accordance with embodiments.

With reference to FIGS. 4A and 4B, FIG. 5 and FIG. 6 and in accordance with embodiments, the shouldered shaft assembly 101 of FIG. 1 can be modified such that at least one or more of the OD surface 118 can be formed to define microscopic surface texturing 401 for increased fluid-dynamic interaction with the radially inwardly facing tilt pad bearings 113 of FIG. 2 (see FIG. 4A), the radially inwardly facing tilt pad bearings 113 can be formed to define microscopic surface texturing 501 for increased fluid-dynamic interaction with the OD surface 118 (FIG. 5) and the axially facing tilt pad thrust bearings 114 can be formed to define microscopic surface texturing 601 for increased fluid-dynamic interaction with the axial surface 117 (see FIG. 6). Although not shown, it is to be understood that the axial surface 117 can also be formed to define microscopic surface texturing.

In the embodiments of FIGS. 4A and 4B, the microscopic surface texturing 401 can be provided as dimples 410 that can be arranged in a circumferential array around and along the OD surface 118. In some cases, the dimples 410 can be arranged in a grid-pattern 411. In any case, each dimple 410 can be one or more of spherical and cylindrical with rounded edges and each dimple 410 can have a depth of about 0.00254 mm to about 0.0127 mm depending on the surface 118 radius. The formation of the dimples 410 and the generally similar sizes, shapes and characteristics of each of the dimples 410 distinguishes the dimples 410 from surface roughness of the OD surface 118, which may not be uniform, which may be randomly exhibited along the OD surface, and which may be substantially shallower than the dimples 410.

The microscopic surface texturing 501 and 601 of FIGS. 5 and 6 can be provided as dimples in a similar manner as described above.

Although the embodiments of FIGS. 4A and 4B, FIG. 5 and FIG. 6, are presented and described herein separately, it is to be understood that the various embodiments can be combined with one another in multiple combinations. For example, the OD surface 118 and the radially inwardly facing tilt pad bearings 113 can both be formed to define microscopic surface texturing 401 and 501, respectively. As another example, the OD surface 118 and the axially facing tilt pad thrust bearings 114 can both be formed to define microscopic surface texturing 401 and 601, respectively. In yet another example, the OD surface 118, the radially inwardly facing tilt pad bearings 113 and the axially facing tilt pad thrust bearings 114 can all be formed to define microscopic surface texturing 401, 501 and 601 (along with microscopic surface texturing of the axial surface 117).

In accordance with embodiments, in the exemplary case of the OD surface 118 and the radially inwardly facing tilt pad bearings 113 both being formed to define microscopic surface texturing 401 and 501, respectively, the microscopic surface texturing 401 and 501 can be aligned or offset as shown in FIG. 4B.

However the microscopic surface texturing 401, 501 and 601 is provided, the presence of the microscopic surface texturing 401, 501 and 601 effectively increases the lifting force F (see FIG. 3) generated by the tilt pad body 301 to urge the body 304 away from the tilt pad body 301. The increase in the lifting force F is caused by multiple factors including, but not limited to, an increase in a total amount of fluid hydrodynamic pressure provided between the tilt pad body 301 and the body 304, changes to film layers and microscopic dimple local hydrodynamic forces formed between the tilt pad body 301 and the body 304 and changes to fluid dynamics between the tilt pad body 301 and the body 304.

In any case, the microscopic surface texturing 401, 501 and 601 provides for increased fluid film generation and formation between the axial surface 117 and the axially facing tilt pad thrust bearings 114 and between the OD surface 118 and the radially inwardly facing tilt pad bearings 113 and serves to increase an ability of the variable displacement, bent axis piston pump 101 to react to the axial and radial loads without need for structural changes to its various components that might otherwise increase a size and weight of the variable displacement, bent axis piston pump 101.

Technical effects and benefits of the features described herein are the provision of a fluid machine, such as a variable displacement, bent axis piston pump, which is characterized as having increased radial and axial load carrying capabilities in a relatively small package with reduced weight.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A support assembly for a shouldered shaft of a variable displacement, bent axis piston pump, the support assembly comprising:
   a bearing retainer housing comprising radially inwardly facing tilt pad bearings and axially facing tilt pad thrust bearings; and
   a shouldered shaft disposed in the bearing retainer housing and comprising:
   a first shaft section;
   a second shaft section having a larger diameter than the first shaft section and comprising an outer diameter (OD) surface, which faces and fluid-dynamically interacts with the radially inwardly facing tilt pad bearings, and which is formed to define microscopic surface texturing for increased fluid-dynamic interaction; and
   an axial surface, which extends between the first shaft section and the second shaft section, and which faces and fluid-dynamically interacts with the axially facing tilt pad thrust bearings.

2. The support assembly according to claim 1, wherein the OD surface is formed to define dimples as the microscopic surface texturing.

3. The support assembly according to claim 2, wherein the dimples are arranged in a grid-pattern.

4. The support assembly according to claim 2, wherein the dimples have a depth of about 0.00254 mm to about 0.0127 mm.

5. The support assembly according to claim 1, wherein at least one or more of the radially inwardly facing tilt pad bearings, the axially facing tilt pad thrust bearings and the axial surface are/is formed to define additional microscopic surface texturing for increased fluid-dynamic interaction.

6. The support assembly according to claim 5, wherein the radially inwardly facing tilt pad bearings are formed to define the additional microscopic surface texturing such that each additional microscopic surface textural element is axially offset from a corresponding microscopic surface textural element of the microscopic surface texturing of the OD surface.

7. A support assembly for a shouldered shaft of a variable displacement, bent axis piston pump, the support assembly comprising:
- a bearing retainer housing comprising radially inwardly facing tilt pad bearings and axially facing tilt pad thrust bearings; and
- a shouldered shaft disposed in the bearing retainer housing and comprising:
  - a first shaft section;
  - a second shaft section having a larger diameter than the first shaft section and comprising an outer diameter (OD) surface, which faces and fluid-dynamically interacts with the radially inwardly facing tilt pad bearings; and
  - an axial surface, which extends between the first shaft section and the second shaft section, and which faces and fluid-dynamically interacts with the axially facing tilt pad thrust bearings,
- the radially inwardly facing tilt pad bearings being formed to define microscopic surface texturing for increased fluid-dynamic interaction.

8. The support assembly according to claim 7, wherein the radially inwardly facing tilt pad bearings are formed to define dimples as the microscopic surface texturing.

9. The support assembly according to claim 8, wherein the dimples are arranged in a grid-pattern.

10. The support assembly according to claim 8, wherein the dimples have a depth of about 0.00254 mm to about 0.0127 mm.

11. The shouldered support assembly according to claim 7, wherein the axially facing tilt pad thrust bearings, the axial surface and the OD surface define additional microscopic surface texturing.

12. The support assembly according to claim 11, wherein the OD surface defines the additional microscopic surface texturing such that each additional microscopic surface textural element is axially offset from a corresponding microscopic surface textural element of the microscopic surface texturing of the radially inwardly facing tilt pad bearings.

13. A support assembly for a shaft of a variable displacement, bent axis piston pump, the shaft assembly comprising:
- a bearing retainer housing comprising radially inwardly facing tilt pad bearings and axially facing tilt pad thrust bearings; and
- a shaft disposed in the bearing retainer housing and comprising:
  - a first shaft section;
  - a second shaft section having a larger diameter than the first shaft section and comprising an outer diameter (OD) surface, which faces and fluid-dynamically interacts with the radially inwardly facing tilt pad bearings; and
  - an axial surface, which extends between the first shaft section and the second shaft section, and which faces and fluid-dynamically interacts with the axially facing tilt pad thrust bearings,
- the axially facing tilt pad thrust bearings being formed to define microscopic surface texturing for increased fluid-dynamic interaction.

14. The support assembly according to claim 13, wherein the axially facing tilt pad thrust bearings are formed to define dimples as the microscopic surface texturing.

15. The support assembly according to claim 14, wherein the dimples are arranged in a grid-pattern.

16. The support assembly according to claim 14, wherein the dimples have a depth of about 0.00254 mm to about 0.0127 mm.

17. The support assembly according to claim 13, wherein the radially inwardly facing tilt pad thrust bearings, the axial surface and the OD surface define additional microscopic surface texturing.

* * * * *